United States Patent
Fan et al.

(10) Patent No.: US 12,373,446 B1
(45) Date of Patent: Jul. 29, 2025

(54) SEARCH ENGINE FOR RECOMMENDING SEARCH QUERIES BASED ON USER INTERACTIONS USING A TRANSFORMER-BASED LANGUAGE MODEL

(71) Applicant: Maplebear Inc., San Francisco, CA (US)

(72) Inventors: Raochuan Fan, Sunnyvale, CA (US); Lee Cohn, Chicago, IL (US); Taesik Na, Issaquah, WA (US); Vinesh Reddy Gudla, South San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/616,719

(22) Filed: Mar. 26, 2024

(51) Int. Cl.
*G06F 16/2457* (2019.01)
*G06F 16/248* (2019.01)
*G06N 3/084* (2023.01)

(52) U.S. Cl.
CPC ...... *G06F 16/24578* (2019.01); *G06F 16/248* (2019.01); *G06N 3/084* (2013.01)

(58) Field of Classification Search
CPC .......... G06F 16/2425; G06F 16/24578; G06F 16/248; G06F 16/3325; G06F 16/3334; G06F 16/3338; G06F 16/3347; G06F 16/3349; G06F 16/335; G06F 16/90324; G06F 16/9532; G06F 16/9535; G06F 16/953; G06F 40/284; G06F 11/34; G06F 17/16; G06F 18/2113; G06N 20/00; G06N 3/08; G06N 3/084; G06N 7/01

See application file for complete search history.

(56) References Cited

U.S. PATENT DOCUMENTS

| | | | |
|---|---|---|---|
| 12,099,533 B2 * | 9/2024 | Osuala ............... | G06F 16/3338 |
| 2022/0100756 A1 * | 3/2022 | Bodigutla ............ | G06F 16/248 |
| 2023/0088171 A1 * | 3/2023 | Cai ...................... | G06F 16/954 |
| | | | 707/706 |
| 2024/0070210 A1 * | 2/2024 | Balasubramanian ....................... | |
| | | | G06Q 30/0631 |
| 2024/0311653 A1 * | 9/2024 | Raj ........................ | G06N 20/00 |
| 2024/0330695 A1 * | 10/2024 | Manchanda ............ | G06N 3/04 |
| 2025/0005346 A1 * | 1/2025 | Lo ......................... | H04L 67/535 |

\* cited by examiner

*Primary Examiner* — Robert W Beausoliel, Jr.
*Assistant Examiner* — Cheryl M Shechtman
(74) *Attorney, Agent, or Firm* — Fenwick & West LLP

(57) ABSTRACT

An online system provides a search interface for a user to identify items. The search interface may present suggested search queries to the user, allowing the user to select a suggested search query rather than manually entering search terms to form a search query. To identify search queries most likely to be selected by the user, the online system gets a set of candidate search queries and generates a relevance score for each candidate search query by applying a trained query relevance model to each candidate search query. The scored candidate search queries are selected and ranked using the relevance scores, and the selected candidate search queries are displayed using the ranking in the search interface. The query relevance model is a transformer-based small language model receiving a user sequence of prior search queries and items with which the user interacted and the candidate search terms as input.

20 Claims, 5 Drawing Sheets

SEARCH ENGINE FOR RECOMMENDING SEARCH QUERIES BASED ON USER INTERACTIONS USING A TRANSFORMER-BASED LANGUAGE MODEL

BACKGROUND

Online systems allow users to identify and interact with various types of items. For example, online concierge systems receive orders from users for items offered by a retailer and allocate an order to a picker for fulfillment. A picker to whom the order was allocated obtains items in the order from a retailer identified by the order. Subsequently, to fulfill the order, the picker delivers the obtained items to a user from whom the online concierge system received the order. In other examples, an online system maintains items comprising video data, audio data, image data, or other types of data with which users may perform different interactions (e.g., view an item, store an item in a collection, download an item, etc.).

As online systems may maintain increasingly large numbers of items, many online systems receive search queries comprising search terms from a customer through a search interface. The online system identifies items having attributes that at least partially match the received search query and displays the identified items to the user. This reduces a number of items for the user to review, allowing the user to select items more easily for performing an interaction (e.g., including in an order, viewing, etc.).

An online system may display recommended search queries to a user when the customer initially accesses a search interface to aid the user in creating a search query. The user may select a recommended search query displayed by the search interface to initiate a search by the online system using the selected recommended search query. Conventional online systems display recommended search queries based on previously received search queries from the user, or from multiple users. For example, an online system displays recommended search queries that are search queries received within a threshold amount of time from the user accessing the search interface or that are search queries that the online e system received from the user at least a threshold number of times or received with at least a threshold frequency. However, determining recommended search queries based on previously received search queries does not account for other kinds of interactions by the customer with the online system or account for relationships between different previously received search queries. This limits the recommended search queries displayed to a user, increasing a likelihood of the customer manually entering search terms for a search query, which increases an amount of interaction with, and time spent on, the search interface by the customer to identify items.

SUMMARY

In accordance with one or more aspects of the disclosure, an online system maintains various items with which users may interact. For example, an online system receives orders from customers for fulfillment. In various embodiments, an order includes identifiers of one or more items offered by a retailer, an identifier of a retailer, a time for providing the items in the order to a customer, and a location for delivering the items in the order. As another example, an online system maintains items (e.g., video content, audio content, image content, text content, etc.) that a user may view or store to a collection associated with the user for subsequent retrieval.

To simplify identification of items for interaction by a user, the online system generates one or more search interfaces for presentation to the user. A search interface includes a search element, such as a search box, configured to receive a search query from the user. In response to receiving the search query, the online system identifies items offered by the online system (e.g., items offered by a retailer, items offered by the online system) that have item attributes at least partially satisfying the search query. The online system displays the identified items to the user, allowing the user to select one or more of the identified items. For example, the user selects an identified item for inclusion in an order or for storage in a collection of items associated with the user. As online systems offer a large variety of items, identifying items based on a search query reduces an amount of time for the user to interact with various items (e.g., create an order including items).

While receiving a search query from the user reduces a number of items for the customer to review, providing the search query to the online system may involve multiple inputs from the user. For example, a search query includes multiple terms that the user manually types or otherwise inputs to the online system. This increases an amount of interaction between the user and the online system to provide the search query, which may discourage the user from providing certain search queries, reducing a probability of the user identifying and interacting with certain items via the online system.

To simplify obtaining a search query from the user, in response to receiving a request from the user for a search interface, the online system retrieves prior search queries previously received from the user and prior interactions by the user with the online system from a data store. In various embodiments, the prior search queries each satisfy one or more criteria. For example, each prior search query was received within a threshold amount of time from a time when the online system received the request for the search interface from the user.

In some embodiments, the online system retrieves a specific type of prior interaction by the user. For example, the online system retrieves prior interactions where the user included an item in an order. As another example, the online system retrieves prior interactions where the user included an item in a collection of items associated with the user. In another example, the online system retrieves prior interactions where the user viewed an item (e.g., watched a video, retrieved additional information about an item). In some embodiments, the online system ranks prior interactions from the user having the specific type based on times when the prior interactions occurred and retrieves prior interactions having at least a threshold position in the ranking. For example, the online system ranks prior interactions from the user so more recently occurring prior interactions have higher positions in the ranking and retrieves prior interactions having at least a threshold position. Each of the prior interactions ranked by the online system may have a type selected from a set of one or more types (e.g., including an item in an order, viewing an item), in some embodiments.

Based on the retrieved prior search queries and the retrieved prior interactions by the user, the online system generates a user sequence representing how the user interacted with the online system over time. The user sequence includes at least a subset of the prior search queries retrieved by the online system, so the user sequence describes at least a partial search history of the user with the online system. In some embodiments, the subset of the prior search queries includes prior search queries received by the online concierge system within a sequence time interval from a time when the online system received the request for the search interface from the user. The sequence time interval is less than a time interval used to retrieve the prior search queries in various embodiments.

However, the search history of the user provides an incomplete record of the user's interactions with the online system over time, so the online system leverages the retrieved prior interactions to identify item identifiers and includes the item identifiers in the user sequence. Each item identifier included in the user sequence is associated with a prior interaction by the user retrieved by the online system. In various embodiments, each item identifier is associated with a prior interaction having a specific type and received within a threshold amount of time from a time when the user requested the search interface. For example, each item identifier is associated with a retrieved order generated by the user within a threshold amount of time from a time when the user requested the search interface. As another example, each item identifier is associated with an item for which the user obtained additional information within a threshold amount of time from a time when the user requested the search interface. Hence, the user sequence includes a combination of prior search terms from the user and item identifiers associated with one or more prior interactions by the user with the online system satisfying one or more criteria. For purposes of explanation, the user sequence may be referred to as including a series of "tokens," with each token comprising a prior search query from the user or an item identifier. In some embodiments, each token has a position in the user sequence, allowing the user sequence to order tokens. In some embodiments, the user sequence determines a position of a token based on a time associated with the token, with tokens having later times having later positions in the user sequence.

In addition to generating the user sequence, the online system generates a set of candidate search queries for the user based on the prior search queries received from the customer and the prior interactions by the user with the online system. In some embodiments, the online system identifies prior search queries received within a particular time interval as candidate search queries. For example, the set of candidate search queries includes prior search queries received by the online system within a candidate threshold time interval (e.g., 30 days, 60 days, etc.) of a time when the request for the search interface was received. In various embodiments, the set of candidate search queries is based at least in part on prior interactions by the user with the online system. For example, the set of candidate search queries includes prior search queries received from the customer prior to the customer performing an interaction having a specific type. In an example, the set of candidate search queries includes prior search queries received from the user within a threshold amount of time before the user included an item in an order. In various embodiments, the online system includes prior search queries received from the user before the user performed an interaction with a type from a set of types, allowing the set of candidate search queries to account for different types of interactions performed by the user.

The online concierge system applies a query relevance model to the user sequence and to the set of candidate search queries. The query relevance model includes a user sequence encoder and a classifier. In various embodiments, the query relevance model is a network comprising multiple layers, with a set of layers comprising the user sequence encoder and a different set of layers, or a single layer, comprising the classifier. The user sequence encoder receives the user sequence as input and generates a sequence embedding that represents the user sequence in a latent space. The classifier receives the sequence embedding and embeddings for each candidate search query of the set of candidate search queries and generates a set of relevance scores including a relevance score for each candidate search query of the set of candidate search queries. The relevance score for a candidate search query represents a probability of the candidate search query being a subsequent token to the last token in the user sequence. So, the set of relevance scores generated by the query relevance model identifies probabilities of each candidate search query of the set of candidate search queries being received from the customer given the previously received subset of prior search queries and item identifiers included in the user sequence.

In various embodiments, the query relevance model has a bidirectional encoder representations from transformers (BERT) architecture. In such a BERT architecture, an input, such as the user sequence, is analyzed from first to last token and from last to first token, allowing determination of relationships between a token and all other tokens in the user sequence. Reviewing tokens surrounding a token in the input allows the query relevance model to better understand relationships between tokens, which provides more information about predicting a subsequent interaction by the user. To train such a query relevance model, the online system uses masked language modeling, where one or more tokens in an input are replaced by a mask and the query relevance model is applied to the masked input to generate predicted tokens corresponding to the masks. Based on differences between the tokens replaced by the mask and the corresponding predicted tokens, parameters of the query relevance model are modified through backpropagation.

The online system trains the user sequence encoder of the query relevance model through application to a set of training user sequences then freezes parameters of the user sequence encoder in various embodiments. Subsequently, the online system applies the query relevance model to a different set of query training user sequences. Each query training user sequence has a search query in a final position of the query training user sequence. The online system replaces a final token in each query training user sequence with a mask to create a masked query training user sequence. The online system applies the query relevance model to each masked query training user sequence to generate a predicted token for the mask and determines a difference between the predicted token for a masked query training user sequence and a token in the corresponding query training user sequence replaced by the mask. The online system modifies one or more parameters of the classifier through backpropagation based on the determined differences to train the classifier.

Based on the set of relevance scores, the online system selects one or more candidate search queries of the set of candidate search queries as recommended search queries. In some embodiments, the online system ranks the set of candidate search queries based on their corresponding relevance scores and selects one or more candidate search queries having at least a threshold position in the ranking as recommended search queries. For example, the online system ranks candidate search terms of the set so candidate search terms with higher relevance scores have higher positions in the ranking and selects a candidate search query having a highest position in the ranking as a recommended search query, or having at least a threshold position in the ranking as recommended search queries.

In various embodiments, the online system accounts for information in addition to corresponding relevance scores when selecting recommended search queries from the candidate search queries. For example, the online concierge system generates a query score for each candidate search query, with the query score for a candidate search query based on a relevance score for the search query and an expected revenue, or an expected amount of interaction with an item, for the candidate search term based on one or more items satisfying the candidate search query. As an example, the query score for a candidate search query is a product of a relevance score for the candidate search query and an expected revenue for the candidate search query. In other embodiments, the online system differently combines the relevance score for a candidate search term and an expected revenue (or an expected amount of interaction) for the candidate search term to generate a query score. The online system ranks the candidate search queries based on their query scores and selects one or more candidate search queries based on the ranking as recommended search queries, or selects candidate search queries having at least a threshold query score as recommended search queries.

After selecting one or more recommended search queries from the set of candidate search queries, the online system generates instructions for generating a search interface and transmits the instructions to a user client device of the user. The instructions include the one or more recommended search queries. When executed by the user client device, the instructions cause the user client device to display the search interface with the one or more recommended search queries displayed to the user before the user client device receives an interaction with the search interface from the user.

For example, the online system selects a recommended search query from the set of candidate search queries based on its relevance score (or query score) and transmits instructions to a user client device that displays the recommended query in a search element, such as a search box, of the search interface before the user interacts with the search interface. In embodiments where the online system selects multiple candidate search terms, the search interface displays the recommended search query proximate to a search element, such as a search box, prior to receiving input from the user with the search interface in an order based on their relevance scores or query scores. This initial display of the one or more recommended search queries allows the user to perform a search using one of the recommended search queries rather than manually entering search terms to the search interface to create a search query.

Thus, initially displaying recommended search queries based on their relevance scores reduces an amount of interaction by the user to search for items, allowing the user to identify items more quickly for inclusion in an order, which reduces an amount of time for the user to create an order. As the recommended search queries were selected based on prior search queries and item identifiers associated with prior interactions by the user with the online system, the recommended search queries account for a broader range of customer interactions with the online system than only the customer's prior search queries. As the query relevance model determines relationships between search queries and items with which the user interacted, selecting recommended queries based on the query relevance model increases a likelihood of the recommended search queries being relevant to the user.

DETAILED DESCRIPTION

Figure 1:
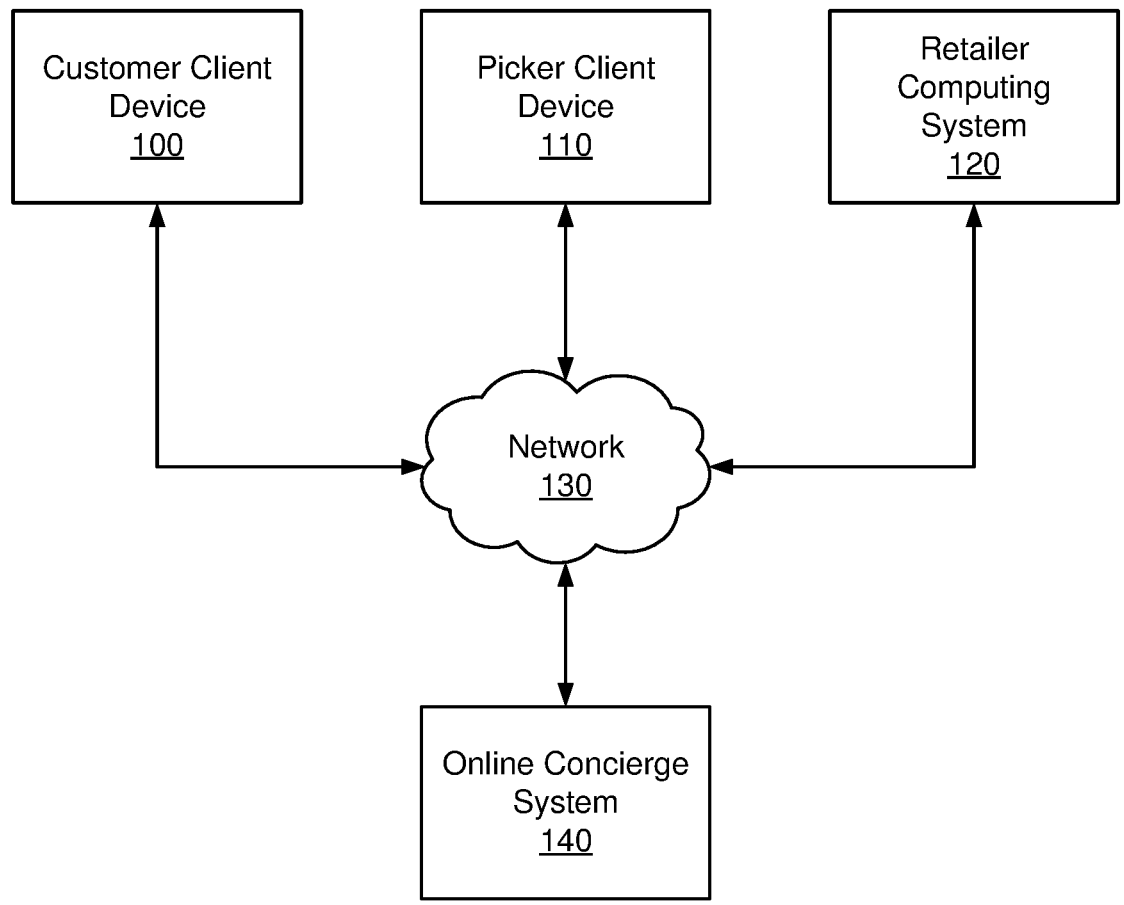
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120. Reference herein to a "user client device" refers to a customer client device 100, a picker client device 100, a retailer computing system 120, or another computing device receiving data from the online concierge system 140 or transmitting data to the online concierge system 140.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
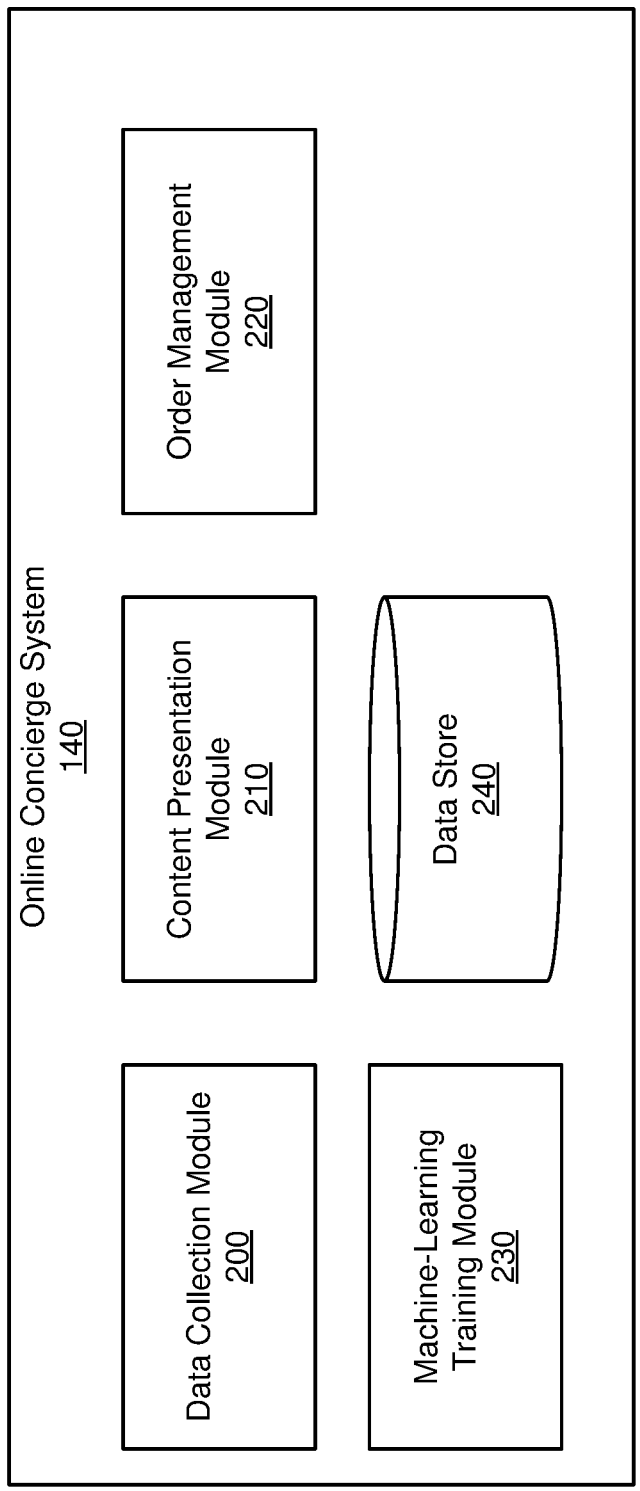
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. The content presentation module 210 generates and displays one or more search interfaces to a user. The user enters one or more search terms comprising a search query via a search element included in a search interface. For example, a search element is a search box that receives one or more words or phrases comprising a search query. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

To simplify receipt of a search query from a user, a search interface displays one or more recommended search queries to the user before receiving input from the user in various embodiments. For example, the search interface displays a recommended search query in or proximate to a search element when the search interface is initially displayed to a user and before the user provides one or more inputs to the search element. As another example, the search interface displays multiple recommended search queries proximate to the search element, allowing the user to select a recommended search query. The online concierge system 140 retrieves candidate items with item attributes that at least partially match the selected recommended search query. To increase a likelihood of a user selecting a recommended search query, the content presentation module 210 uses both prior search queries received from a user and items with which the user performed one or more interactions, such as one or more specific interactions, to generate a user sequence describing interaction by the user with the online concierge system 140. Accounting for both items with which a specific interaction was performed and prior search queries when selecting recommended search queries allows the content presentation module 210 to account for a broader range of interactions by the user with the online concierge system 140 than prior search queries, allowing selection of candidate search queries to account for items with which the user interacted. As further described below in conjunction with FIGS. 3-5, the content presentation module 210 generates relevance scores for multiple candidate search queries based on the generated user sequence and selects one or more candidate search queries for display as recommended search queries based on the relevance scores.

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

As further described below in conjunction with FIGS. 3-5, in various embodiments, the machine learning training module 230 trains and stores a query relevance model that determines relevance scores for each of multiple candidate search queries. The query relevance model includes a user sequence encoder and a classifier in various embodiments. The query relevance model receives a user sequence for a user and a set of candidate search queries for a customer. The user sequence includes multiple tokens, with each token comprising a prior search query received from the user or an item identifier of an item with which the user interacted, as further described below in conjunction with FIGS. 1-3. The candidate search queries are each prior search queries received from the user that satisfy one or more criteria, such as being received during a candidate threshold time interval. The user sequence encoder generates a sequence embedding representing the user sequence in a latent space, and the classifier receives the sequence embedding and embeddings for each of the candidate search queries. Based on the sequence embedding and an embedding for a candidate search query, the classifier generates a relevance score for the candidate search query representing a probability of the candidate search query having a subsequent position in the user sequence. Hence, the query relevance model generates a relevance score for each candidate search query based on the user sequence.

In various embodiments, the query relevance model has a bidirectional encoder representations from transformers (BERT) architecture, as further described below in conjunction with FIGS. 3 and 4. In such a BERT architecture, the user sequence is analyzed from first to last token and from last to first token to determine relationships between a token and all other tokens in the user sequence. Reviewing tokens surrounding a token in the input allows the query relevance model to better understand relationships between tokens providing more information about user intent for subsequent interactions. To train a query relevance model with the BERT architecture, the machine learning training module 230 uses masked language modeling, where one or more tokens in an input are replaced by a mask to generate masked input. The machine learning training module 230 applies to the masked input to generate predicted tokens corresponding to the masks. Based on differences between the tokens replaced by the mask and the corresponding predicted tokens, the machine learning training module 230 modifies parameters of the query relevance model through back-propagation, The machine learning training module 230 trains the user sequence encoder of the query relevance model through application to a set of masked inputs based on training user sequences including prior search queries and item identifiers. The machine learning training module 230 freezes parameters of the user sequence encoder in various embodiments. Subsequently, the machine learning training module 230 applies the query relevance model to a different set of query training user sequences. Each query training user sequence has a search query in a final position of the query training user sequence and includes prior search queries and item identifiers. The machine learning training module 230 replaces a final token in each query training user sequence with a mask to create a masked query training user sequence. By applying the query relevance model to each masked query training user sequence, the machine learning training module 230 generates a predicted token for the mask and determines a difference between the predicted token for a masked query training user sequence and a token in the corresponding query training user sequence replaced by the mask. The machine learning training module 230 modifies one or more parameters of the classifier through backpropagation based on the determined differences to train the classifier. Training of the query relevance model is further described below in conjunction with FIG. 4.

The data store 240 stores data used by the online concierge system 140. For example, the data store 240 stores customer data, item data, order data, and picker data for use by the online concierge system 140. In various embodiments, the data store 240 stores data describing prior search queries received from a user in conjunction with a time when a prior search query was received. Further, the data store 240 stores data describing interactions users performed with the online concierge system 140; for example, the data store 240 stores a description of an interaction in association with user identifier of a user who performed the interaction and a time when the interaction was performed. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
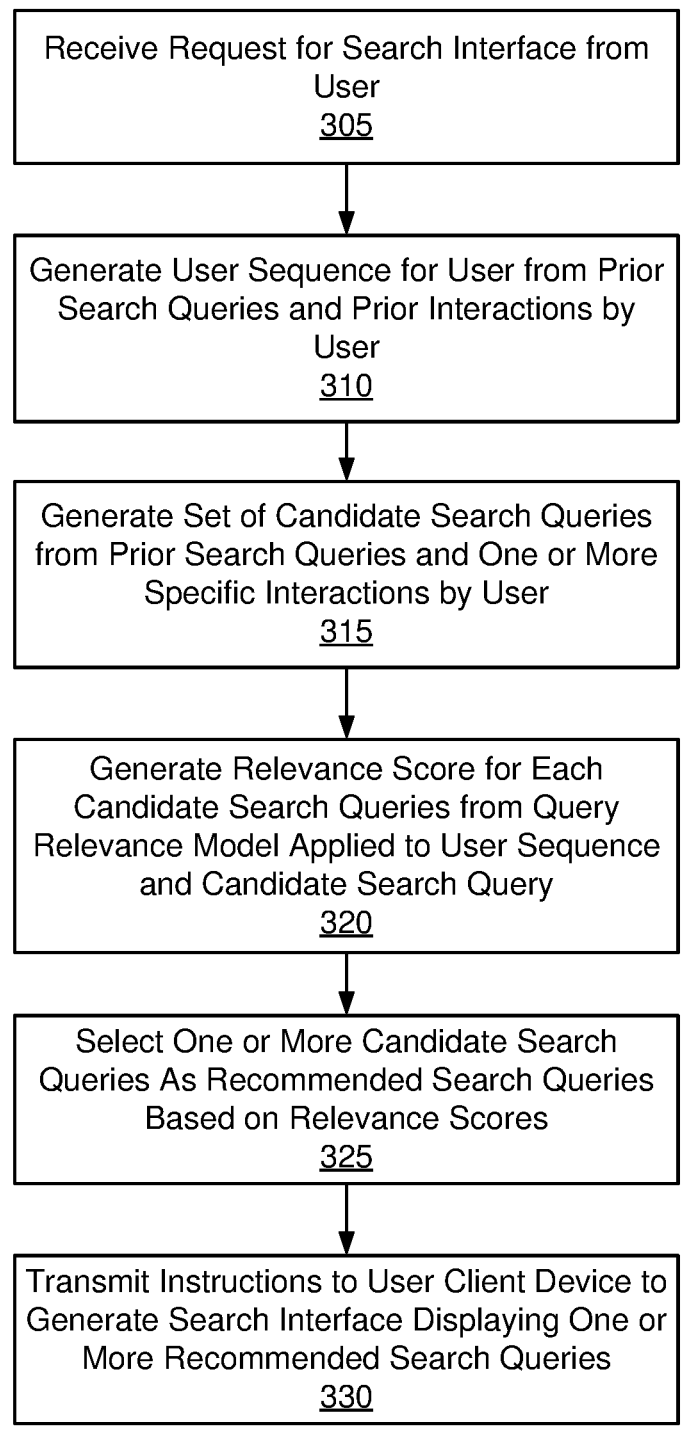
FIG. 3 is a flowchart of a method for generating a search interface including one or more recommended search queries displayed to a user, in accordance with one or more embodiments.

FIG. 3 is a flowchart of a method for generating a search interface including one or more recommended search queries displayed to a customer, in accordance with some embodiments. Alternative embodiments may include more, fewer, or different steps from those illustrated in FIG. 3, and the steps may be performed in a different order from the order illustrated in FIG. 3. These steps may be performed by an online concierge system (e.g., online concierge system 140). Additionally, each of these steps may be performed automatically by the online concierge system without human intervention.

An online system, such as an online concierge system 140, offers various items with which users may interact. For example, an online system maintains various items that a user may purchase in an order. As another example, an online system maintains various items of content that a user may view, store in a collection, or with which the user may perform other interactions. The online system may maintain a large number of items, so to simplify identification of items by a user, the online system receives one or more search queries from the user and identifies a subset of items based on the search query. This reduces a number of items that a user reviews based on the search query.

To obtain a search query from a user, the online system receives 305 a request for a search interface from a user. For example, the user selects an interface element in an interface generated by the online system and displayed on a user client device, and the online system receives 305 the request for the search interface in response to the user's selection of the interface element. As another example, an interface displayed to the user by the user client device includes a search element, such as a search bar or a search icon, the online system receives 305 the request for the search interface in response to the interface receiving an input from the user selecting or accessing a search element in an interface displayed by the user client device.

In response to receiving 305 the request for the search interface, the online system generates 310 a user sequence based on prior interactions by the user with the online system. In some embodiments, the received request includes an identifier of the user. Alternatively the online system determines a customer identifier from prior access to the online system by the user, such as a prior login to the online system by the user, who initiated transmission of instructions for generating one or more interfaces from the online system to the user client device of the user. The user sequence comprises a plurality of tokens, with each token comprising a prior search query received from the customer or an item identifier, as further described below. Each token has a position in the user sequence in various embodiments, so the tokens have an order in the user sequence determined by the positions of different tokens.

To generate 310 the user sequence, the online system retrieves prior search queries received from the user and stored in association with the user in the data store 240. For example, the data store 240 stores search queries received from the user in association with the user identifier of the user from whom the search queries were received. The data store 240 also stores a time in association with each search query, maintaining a history of each search query received from the user and when each search query was received. In various embodiments, the online system includes prior search queries received from the user within a specific time interval in the user sequence. For example, the online system includes prior search queries received from the customer within a threshold time interval from a time when the online system received 305 the request for the search interface in the user sequence. As an example, the online system includes prior search queries received from the user within 90 days of a time when the online system received 305 the request for the search interface in the user sequence. Thus, one or more tokens comprising the user sequence are prior search queries received from the user.

While prior search queries from the user provide information about some of the user's prior interactions with the online system, other interactions by the user with the online system provide additional information about the user's preferences or interests. To augment the prior search queries included in the user sequence with additional information about the user, the online system identifies one or more prior interactions with the online system by the user and selects item identifiers of items associated with each of the identified prior interactions for the user sequence. In various embodiments, the online system identifies prior interactions by the user having a specific type and selects item identifiers associated with the prior interactions having the specific type. For example, the online system identifies prior interactions where the user generated an order and selects item identifiers of items included in the prior orders by the user. As another example, the online system identifies prior interactions where the user requested information about an item and selects item identifiers of one or more items about which the user requested information. In an additional example, the online system identifies prior interactions that included an item in a collection associated with the user and includes item identifiers of one or more items included in a collection based on the identified interactions.

In some embodiments, the online system identifies different types of interactions and selects item identifiers of items associated with at least one of the identified interactions. In some embodiments, the online concierge system 140 selects item identifiers of items associated with prior interactions satisfying one or more criteria. For example, the online system ranks identified prior interactions based on times when the prior interactions occurred and selects item identifiers associated with prior interactions having at least a threshold position in the ranking. As an example, the online system ranks prior orders created by the user so more recently created orders have higher positions in the ranking and selects item identifiers of items included in prior orders having at least a threshold position in the ranking for the user sequence; this includes item identifiers included in more recently created orders in the user sequence. Item identifiers selected by the online concierge system 140 are included as tokens in the user sequence. The online system combines the selected item identifiers with the prior search queries received from the user, further described above, to generate 310 the user sequence. Hence, the user sequence includes multiple tokens that each comprise a prior search query received from the user or an item identifier associated with prior interactions, such as prior order creation, performed by the user. In some embodiments, the user sequence includes at least one prior search query from the customer and at least one item identifier. This allows the user sequence to augment prior search queries from the user with item identifiers corresponding to one or more interactions performed by the user.

The online system generates 315 a set of candidate search queries based on prior search queries from the user. As further described above, the data store 240 stores search queries received from the user in association with a user identifier and a corresponding time when a prior search query was received. The online system identifies previously received search queries received within a particular time interval as candidate search queries. For example, the set of candidate search queries includes prior search queries received within a candidate threshold time interval (e.g., 30 days, 60 days, etc.) of a time when the request for the search interface was received 305. In various embodiments, the candidate threshold time interval is a different length of time than the specific time interval used to generate 310 the user sequence.

In various embodiments, the set of candidate search queries is based at least in part on prior interactions by the user. For example, the online system includes search queries received from the user prior to the user performing a specific type of interaction. In an example, the set of candidate search queries includes search queries received from the user within a threshold amount of time before the user included an item in an order. The online system generates 315 the set of candidate search queries to include prior search queries received from the user prior to an interaction by the user having the specific type and that occurred at least a threshold number of times (or that occurred with at least a threshold frequency) in some embodiments, so the set of candidate search queries includes prior search queries based on frequency with which the customer performed a specific type of interaction (or based on a number of time the user performed the specific interaction). In various embodiments, the online system obtains search queries received from the user before the user performed one or more types of interactions from a set of types, for the set of candidate search queries, so the set of candidate search queries accounts for different types of interactions performed by the user.

For each candidate search query of the set of candidate search queries, the online system generates 320 a relevance score by applying a query relevance model to each combination of the user sequence and a candidate search query of the set of candidate search queries. In various embodiments, the query relevance model is a two-stage model, with a stage comprising a user sequence encoder that generates a sequence embedding representing the user sequence for the customer. A second stage of the query relevance model receives the sequence embedding and an embedding for a candidate search query as an input and generates a relevance score of the candidate search query to the user sequence. The relevance score for a candidate search query is a probability of the candidate search query being a subsequent token after a last token in the user sequence given the prior search queries and item identifiers in the user sequence. In various embodiments, the online concierge system 140 generates a relevance score for each candidate search query of the set of candidate search queries; alternatively, the online system generates a relevance score for each candidate search query in a subset of the candidate search queries. In various embodiments, a sum of the relevance scores for each candidate search query of the set of candidate search queries equals one, although in some embodiments, the online system may normalize the relevance scores to satisfy one or more criteria or so an aggregation of the relevance scores across the set of candidate search queries satisfies one or more criteria.

The query relevance model has a bidirectional encoder representations from transformers (BERT) architecture in various embodiments. In a BERT architecture, the user sequence is analyzed from first to last token and from last to first token to determine relationships between a token and all other tokens in the user sequence. Reviewing tokens surrounding a token in the user sequence allows the query relevance model to better understand relationships between tokens, which provides more information about customer intent from the user sequence. To train a query relevance model with a BERT architecture, the online system uses masked language modeling, where one or more tokens in an input user sequence are replaced by a mask and the query relevance model is applied to the masked input to generate predicted tokens corresponding to the masks. Based on differences between the tokens replaced by the mask and the corresponding predicted tokens, parameters of the query relevance model are modified through backpropagation, as further described below in conjunction with FIG. 4.

To train the user sequence encoder of the query relevance model, the online concierge system 140 generates a dataset of masked user sequences by randomly replacing a specific percentage of tokens in corresponding user sequences with a mask. The user sequence encoder receives the masked user sequence and generates a token embedding for each token included in the masked user sequence. A token embedding for a token in the masked user sequence is received by a classifier, which determines a predicted token for each position in the masked user sequence. The online system determines an error term for each position in the masked input sequence including a mask based on a difference between a predicted token for a position in the masked input sequence including the mask and a token included in the corresponding position in the input sequence. Based on an error term, the online system modifies one or more parameters of the query relevance model (e.g., the user sequence encoder).

Figure 4:
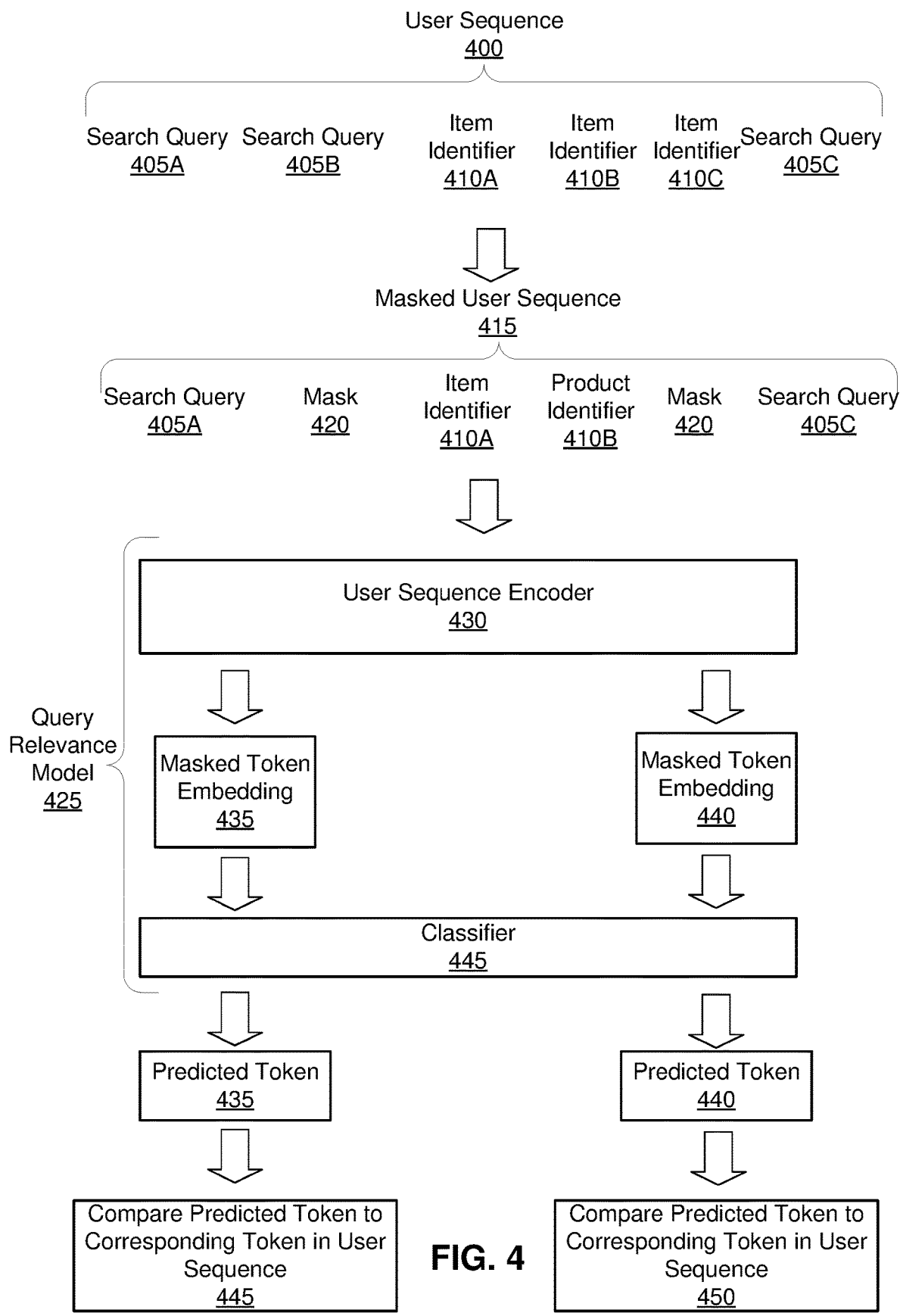
FIG. 4 is a process flow diagram of a method for training a query relevance model to determine recommended search queries for display to a user, in accordance with one or more embodiments.

For purposes of illustration, FIG. 4 shows a process flow diagram of one or more embodiments of a method for training the query relevance model. In the example of FIG. 4, a user sequence 400 generated by the online system for a user, as further described above in conjunction with FIG. 3, includes search query 405A, search query 405B, and search query 405C. The user sequence 400 also includes item identifier 510A, item identifier 510B, and item identifier 510C. Hence, search query 405A, search query 405B, search query 405C, item identifier 410A, item identifier 410B, and item identifier 410C are each tokens of the user sequence 400 and have a specific order relative to each other in the user sequence 400.

From the user sequence 400, the online system generates a masked user sequence 415 by replacing one or more tokens of the user sequence 400 with a mask 420. In various embodiments, the online system randomly selects tokens in the user sequence 400 and replaces each of the randomly selected tokens with the mask 420. For example, the online system replaces a specific percentage (e.g., 10%) of tokens in the user sequence 400 with the mask 420. The online system randomly selects positions within the user sequence 400 and replaces tokens in the selected positions with the mask 420. In the example of FIG. 4, the online system replaces search query 405B with the mask 420 and replaces item identifier 410C with the mask 420 to generate the masked user sequence 415. When generating the masked user sequence 415, the online system stores indications of which tokens of the user sequence were replaced by the mask 420, allowing subsequent retrieval of a token in the user sequence 400 that was replaced by the mask 420.

The online system applies the query relevance model comprising the user sequence encoder 430 and the classifier 445 to the masked input sequence 415. The user sequence encoder 430 generates a token embedding for each token in the masked user sequence 415 and a positional embedding corresponding to each token embedding that identifies a position of a token embedding relative to other tokens in the masked input sequence 415. The positional embeddings allow the user sequence encoder 430 to identify an order in which tokens, and their corresponding token embeddings, occur in the masked input sequence 415. In some embodiments, the positional embeddings provide information identifying relative positions of tokens in the masked user sequence 415, while in other embodiments the positional embeddings identify absolute positions of tokens in the masked customer sequence 415. The positional embeddings may be determined using any suitable method in various embodiments.

Application of the user sequence encoder 420 to the masked user sequenced 420 generates masked token embedding 435 and masked token embedding 440 in the example of FIG. 4, with masked token embedding 435 corresponding to the first occurrence of the mask 420 in the masked user sequence 415 and masked token embedding 440 corresponding to the second occurrence of the mask 420 in the masked user sequence 415. Each token embedding generated by the user sequence encoder 420 is input to the classifier 445, which determines a search query or an item identifier corresponding to each token embedding. For example, the classifier 445 determines a set of probabilities of different candidate tokens being in the masked user sequence 420 in the position corresponding to the mask 420 is and selects a candidate token having a maximum probability as the predicted token corresponding to the position corresponding to the mask. In various embodiments, the classifier 445 determines a probability of the mask 420 in a particular position in the masked user sequence 415 being each candidate token of a set including search queries and item identifiers.

To train the user sequence encoder 420, the online system compares each predicted token corresponding to a position in the masked user sequence 415 including the mask 420 to the token in the corresponding position in the user sequence 400. In the example of FIG. 4, the online concierge system 140 compares 450 the predicted token for the first occurrence of the mask 420 to search query 405B, which is in a position in the user sequence 400 corresponding to a position in the masked user sequence 400 of the first occurrence of the mask 420. Similarly, the online concierge system 140 compares 455 the predicted token for the second occurrence of the mask 420 to item identifier 410B, which is in a position in the user sequence 400 corresponding to a position in the masked user sequence 400 of the second occurrence of the mask 420.

The online system determines an error term for each comparison of a predicted token corresponding to a position of the mask 420 in the masked user sequence 415 and a token in the corresponding position in the user sequence 400. The error term may be generated through any suitable loss function, or combination of loss functions, in various embodiments. For example, the loss function is a cross-entropy loss between a predicted token for the mask 420 at a position in the masked user sequence 415 and a token at a corresponding position in the user sequence 400. However, in other embodiments, any loss function or combination of loss functions, may be applied to the predicted token for the mask 420 at a position in the masked user sequence 415 and a token at a corresponding position in the user sequence 400 to generate the error term.

The online system backpropagates the one or more error terms through layers of a network comprising the user sequence encoder 430. One or more parameters of the network are modified through any suitable technique from backpropagation of the one or more error terms through the layers of the network. For example, weights between nodes of the network, such as nodes in different layers of the network, are modified to reduce the one or more error terms. The backpropagation of the one or more error terms is repeated by the online concierge system 140 until the one or more loss functions satisfy one or more criteria. For example, the one or more criteria specify conditions for when the backpropagation of the one or more error terms through the layers of the network is stopped. In some embodiments, the online system uses gradient descent or any other suitable process to minimize the one or more error terms in various embodiments. The online system may apply the query relevance model to multiple training user sequences and corresponding training masked used sequences, as further described above, when training the query relevance model.

In response to the one or more loss functions satisfying the one or more criteria and the online system stopping the backpropagation of the one or more error terms, the online system stores the set of parameters for the layers of the query relevance model comprising the user sequence encoder 430. For example, the online system stores the weights of connections between nodes in the network comprising the user sequence encoder 430 as the set of parameters of the user sequence encoder 430 in a non-transitory computer readable storage medium. Training the user sequence encoder 430 allows generation of embeddings for each token and positions of tokens in a customer sequence 400, which generates a sequence embedding representing the user sequence 400 in a latent space.

While training the user sequence encoder 430 as further described above generates a sequence embedding representing the user sequence 400, to generate relevance scores for candidate search queries, the online system further trains the query relevance model to train the classifier 445. In various embodiments, the online system trains the classifier 445 after training and storing the user sequence encoder 430. In various embodiments, the online concierge system 140 freezes the parameters comprising the user sequence encoder 430 after training, so subsequent training of the classifier 445 does not alter parameters of the user sequence encoder 430.

To train the classifier, the online system retrieves a set of query training user sequences. Each query training user sequence has a search query in a final position of the query training user sequence. Unlike the training user sequences used when training the user sequence encoder 430, each of the query training user sequences is a sequence ending with a search query. This property of the query training user sequences allows the classifier 445 to be trained specifically for evaluating search queries, rather than both search queries and item identifiers.

For each query training user sequence, the online system replaces a token in a final position of a query training user sequence with the mask 420 to generate a masked query training user sequence. The online system applies the query relevance model including the trained customer sequence encoder 430 to the masked query training user sequence, as further described above. The user sequence encoder 430 generates a token embedding for the token replaced by the mask 420, and the classifier 445 determines a set of probabilities of different search queries of a set of search queries being in the position of the masked query training user sequence including the mask 420 (i.e., in the final position of the query training user sequence) and selects a predicted search query from the set of search queries having the maximum probability as the predicted token corresponding to the position in the masked query training user sequence including the mask 420. In various embodiments, the set of search queries comprises search queries received from a user within a candidate threshold time interval before the user performed a specific interaction that was performed with at least a threshold frequency or that was performed at least a threshold number of times.

The online system determines a query error term for each comparison of a predicted search query corresponding to position of the mask 420 in the masked query training user sequence and the search query in the final position of the query training user sequence. The query error term may be generated through any suitable loss function, or combination of loss functions, in various embodiments. For example, the loss function is a cross-entropy loss between a predicted search query for the mask 420 in the final position of the masked query training user sequence and the search query in the final position of the query training user sequence. However, in other embodiments, any loss function or combination of loss functions, may be used to generate the error term.

The online system backpropagates the one or more error terms through one or more layers of a network of the query relevance model comprising the classifier 445. One or more parameters of the network comprising the classifier 445 are modified, without modifying parameters of the user sequence encoder 430, through any suitable technique from the backpropagation of the one or more error terms through the one or more layers of the network comprising the classifier 445. For example, weights between nodes of the network, such as nodes in different layers of the network, are modified to reduce the one or more error terms. The backpropagation of the one or more error terms is repeated by the online system until the one or more loss functions satisfy one or more criteria. For example, the one or more criteria specify conditions for when the backpropagation of the one or more error terms through the layers of the network is stopped. In some embodiments, the online system uses gradient descent or any other suitable process to minimize the one or more error terms in various embodiments. The online system applies the query relevance model to multiple query training user sequences, as further described above, to modify parameters of the classifier in various embodiments.

In response to the one or more loss functions satisfying the one or more criteria and the online system stopping the backpropagation of the one or more error terms, the online system stores the set of parameters for the one or more layers comprising the classifier 445. For example, the online system stores the weights of connections between nodes in a network as the set of parameters of the classifier 445 in a non-transitory computer readable storage medium. Training the classifier 445 using query training user sequences and a set of search queries tunes the classifier 445 to generate relevance scores more accurately for each search query of a set, so a relevance score for a search query indicates a probability of the search query being in a final position of a user sequence based on the sequence embedding for the user sequence generated by the user sequence encoder 430.

Referring back to FIG. 3, applying the query relevance model to the user sequence generates a sequence embedding for the user sequence from the sequence encoder within the query relevance model. The sequence embedding and the set of candidate search queries are received by the classifier of the query relevance model, which generates 320 a relevance score for each candidate search query of the set of candidate search queries. As further described above, a relevance score for a candidate search query is a probability of the candidate search query having a last position in the user sequence based on the search queries and item identifiers comprising the user sequence. The online system may normalize or modify a probability of the candidate search query having a last position in the user sequence generated by the query relevance model when generating 320 the relevance score in some embodiments.

Based on the relevance scores generated 320 for various candidate search queries, the online system selects 325 one or more candidate search queries as recommended search queries. In some embodiments, the online system selects 325 one or more candidate search queries having at least a threshold relevance score as recommended search queries. Alternatively, the online system ranks the candidate search queries based on their relevance scores and selects 325 one or more candidate search queries having at least a threshold position in the ranking as recommended search queries. For example, the online system ranks candidate search queries so candidate search queries with higher relevance scores have higher positions in the ranking and selects 325 candidate search queries having at least a threshold position in the ranking as recommended search queries.

In some embodiments, the online system generates a query score for each candidate search query based on a corresponding relevance score for a candidate search query and other information associated with the candidate search query. For example, the online system generates a query score for a candidate search query as a product of the relevance score for the candidate search query and an expected revenue to the online system from inclusion of one or more items satisfying the candidate search query in an order. As another example, the query score for a candidate search query is a product of the relevance score for the candidate search query and a probability of the customer including an item in an order subsequent to the search query. The online system may generate a query score for a candidate search query as a combination of the relevance score for the candidate search query and an expected amount of interaction by the user with one or more items satisfying the candidate search query. In other embodiments the query score for a candidate search query may be other combinations of the relevance score for the candidate search query and one or more other values determined or derived by the online system based on items satisfying the candidate search query.

When the online system generates query scores based on corresponding relevance scores, the online system selects 325 one or more candidate search queries as recommended search queries based on the corresponding query scores. In some embodiments, the online system selects 325 one or more candidate search queries having at least a threshold query score as recommended search queries. Alternatively, the online system ranks the candidate search queries based on their query scores and selects 325 one or more candidate search queries having at least a threshold position in the ranking as recommended search queries. For example, the online system ranks candidate search queries so candidate search queries having higher query scores have higher positions in the ranking and selects 325 candidate search queries having at least a threshold position in the ranking as recommended search queries.

The online system transmits 330 instructions for the search interface to the user client device based on the selected 325 recommended search queries. When executed by the user client device, the instructions cause display of one or more of the recommended search queries by the search interface before the user client device receives input from the user. For example, a recommended search query is displayed by the search interface before the user client device receives at least a portion of a search query from the user. For example, the instructions cause the user client device to display a recommended search query in a search box or other search element before the search box or the other search element receives input from the user. As another example, the instructions cause the user client device to display multiple recommended search queries proximate to a search element (e.g., a search box) in an order determined by a ranking of the recommended search queries based on their corresponding relevance scores (or query scores). The recommended search queries are displayed so recommended search queries with higher positions in the ranking are more prominently displayed. This allows the user to select a displayed recommended search query rather than manually enter a search query, reducing an amount of interaction with the search interface by the user to provide a search query used to identify one or more items.

Figure 5:
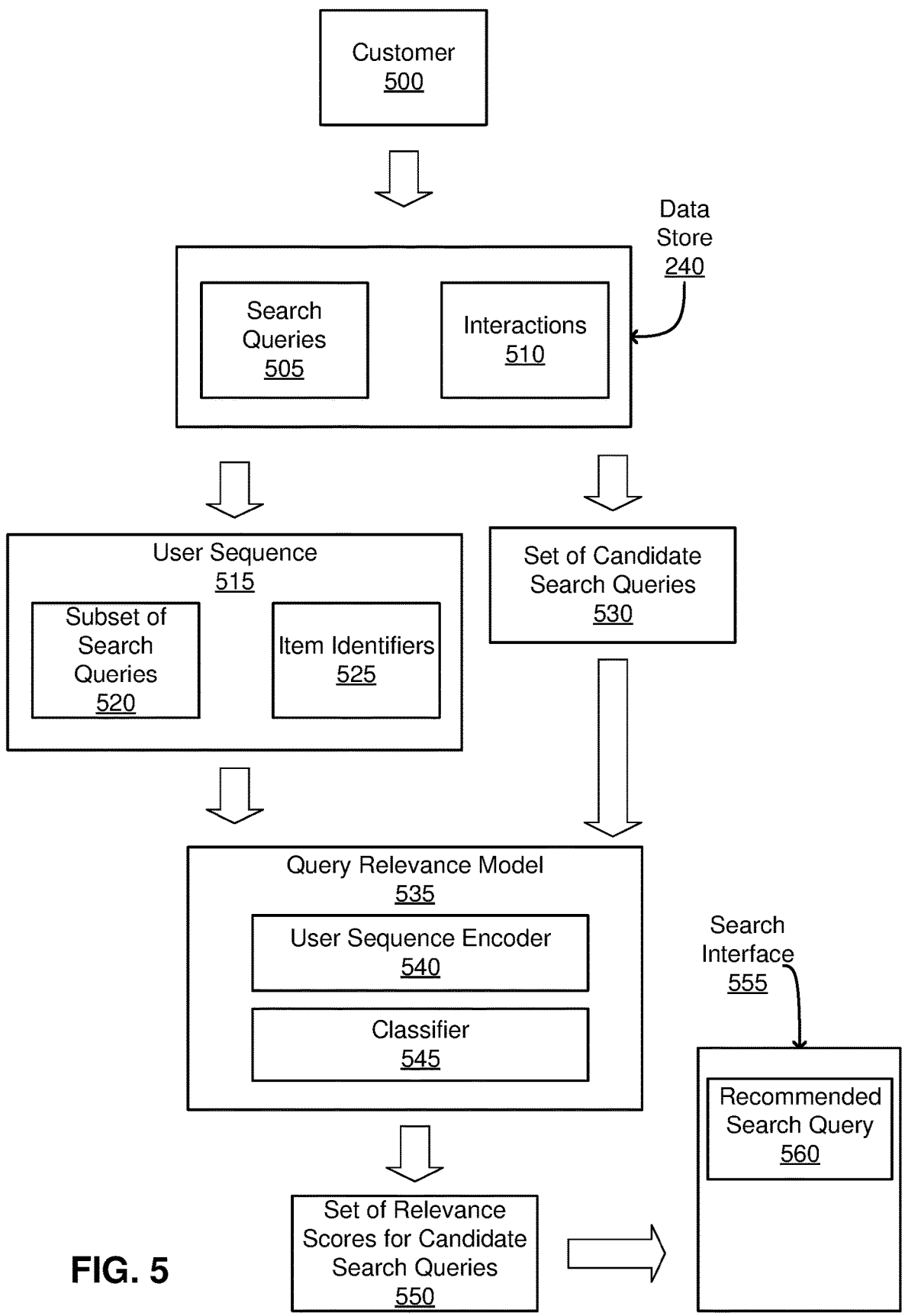
FIG. 5 is a flowchart of a method for generating a search interface including one or more recommended search queries displayed to a user, in accordance with one or more embodiments.

FIG. 5 is a process flow diagram of a method for generating a search interface including one or more recommended search queries displayed to a customer, in accordance with one or more embodiments. An online system maintains various items with which users may interact. For example, an online system (e.g., an online concierge system 140) receives orders from customers for fulfillment. In various embodiments, an order includes identifiers of one or more items offered by a retailer, an identifier of a retailer, a time for providing the items in the order to a customer, and a location for delivering the items in the order. As another example, an online system maintains items (e.g., video content, audio content, image content, text content, etc.) that a user may view or store to a collection associated with the user for subsequent retrieval. Hence, different online systems may maintain different types of items with which users interact.

To simplify identification of items for a user 500, the online system generates one or more search interfaces. Each search interface includes a search element, such as a search box, configured to receive a search query from the user 500. In response to receiving the search query, the online system identifies items having item attributes that at least partially satisfy the search query. For example, an online concierge system 140 identifies offered by a retailer, or by one or more retailers, having item attributes that at least partially satisfy a search query. As another example, an online system identifies items of content that have item attributes at least partially matching a received search query. The online system displays the identified items to the user 500, allowing the user 500 to interact with, or to select, one or more of the identified items. As online systems offer a large variety of items, identifying items based on a search query reduces an amount of time for the user to interact with various items (e.g., create an order including items).

While receiving a search query from the user 500 reduces a number of items for the user 500 to review for interaction, providing the search query to the online system may involve multiple inputs from the user 500. For example, a search query includes multiple terms that the user 500 manually types or otherwise inputs to the online system. This increases an amount of interaction between the user 500 and the online system to provide various search queries, which may discourage the user 500 from providing certain search queries, in turn reducing a probability of the user 500 interacting with certain items.

To simplify obtaining a search query from the user 500, in response to receiving a request from the user 500 for a search interface, the online system retrieves prior search queries 505 previously received from the user 500 and prior interactions 510 by the user 500 with the online concierge system 140 from a data store 240 In various embodiments, the prior search queries 505 each satisfy one or more criteria. For example, each prior search query was received by the online system within a threshold amount of time from a time when the online system received the request for the search interface from the user.

In some embodiments, the online system retrieves a specific type of prior interaction 510 by the user 500 with the online system. For example, the online system retrieves prior interactions 510 where the user 500 included an item in an order, prior interactions 510 where the user 500 generated an order, or prior interactions 510 where the user requested additional information about an item. In some embodiments, the example, the online system ranks prior interactions 510 from the user 500 based on times when the prior interactions 510 occurred and retrieves prior interactions 510 having at least a threshold position in the ranking. For example, the online system ranks prior interactions 510 from the user 500 so more recently occurring prior interactions 510 have higher positions in the ranking and retrieves prior interactions 510 having at least a threshold position in the ranking.

Based on the retrieved prior search queries 505 and the retrieved prior interactions 510 by the user 500, the online system generates a customer sequence 515 representing how the user 500 interacted with the online system over time. The user sequence 515 includes at least a subset 520 of the prior search queries 505 retrieved by the online system to include at least a partial search history of the user 500 with the online system. In some embodiments, the subset 520 of the prior search queries 505 includes prior search queries 505 received by the online system within a sequence time interval from a time when the online system received the request for the search interface from the user 500. The sequence time interval is less than a time interval used to retrieve the prior search queries 505 in some embodiments, so the user sequence 515 includes more recently received search queries 505.

However, the search history of the user 500 provides an incomplete record of interactions by the user 500 with the online system in the past, so the online system leverages the retrieved prior interactions 510 by the user 500 to identify item identifiers 525 for inclusion in the user sequence 520. Each item identifier 525 included in the user sequence 520 is associated with a prior interaction 510 by the user 500 retrieved by the online system. In various embodiments, each item identifier 525 is associated with a prior interaction 510 having a specific type and received within a threshold amount of time from a time when the user 500 requested the search interface. For example, each item identifier is associated with a retrieved order generated by the user 500 within a threshold amount of time from a time when the user 500 requested the search interface. As another example, each item identifier is associated with an item for which the user 500 obtained additional information within a threshold amount of time from a time when the user 500 requested the search interface. Hence, the user sequence 520 includes a combination of prior search terms 505 from the customer and item identifiers 525 associated with one or more prior interactions 510 by the user 500 with the online system satisfying one or more criteria.

For purposes of explanation, the user sequence 520 may be referred to as including a series of "tokens," with each token comprising a prior search query 505 from the user 500 or an item identifier 525. In some embodiments, each token has a position in the customer sequence 520, allowing the customer sequence 520 to order tokens. In some embodiments, the user sequence 520 determines a position of a token based on a time associated with the token, with tokens having later times having later positions in the user sequence 520.

In addition to generating the customer sequence 520, the online system generates a set 530 of candidate search queries for the customer 500 based on the prior search queries 505 from the customer and the prior interactions 510 by the user 500 with the online system. In some embodiments, the online system identifies prior search queries 505 received within a particular time interval as candidate search queries. For example, the set 530 of candidate search queries includes prior search queries 505 received by the online system within a candidate threshold time interval (e.g., 30 days, 60 days, etc.) of a time when the request for the search interface was received. In various embodiments, the set 530 of candidate search queries is based at least in part on prior interactions 510 by the user 500 with the online system. For example, the set 530 of candidate search queries includes prior search queries 505 received from the user 500 prior to the user 500 performing an interaction having a specific type. In an example, the set 530 of candidate search queries includes prior search queries 505 received from the user 500 within a threshold amount of time before the user 500 included an item in an order. In various embodiments, the online system includes prior search queries 505 received from the user 500 before the user 500 performed an interaction having a type selected from a set of types, allowing the set 530 of candidate search queries to account for different types of interactions performed by the user 500.

The online system applies a query relevance model 535 to the customer sequence 515 and to the set of candidate search queries 530, as further described above in conjunction with FIG. 3. The query relevance model 535 includes a user sequence encoder 540 and a classifier 545. In various embodiments, the query relevance model 535 is a network comprising multiple layers, with a set of layers comprising the user sequence encoder 540 and a different set of layers, or a single layer, comprising the classifier 545. The user sequence encoder 540 receives the user sequence 515 as input and generates a sequence embedding representing the user sequence 515 in a latent space. The classifier 545 receives the sequence embedding and embeddings for each candidate search query of the set 530 of candidate search queries and generates a set 550 of relevance scores that includes a relevance score for each candidate search query of the set 530 of candidate search queries. The relevance score for a candidate search query represents a probability of the candidate search query being added to the user sequence 515 subsequent to a final position of the user sequence 515. So, the set 550 of relevance scores generated by the query relevance model 535 identifies probabilities of each candidate search query of the set 530 of candidate search queries being received from the customer given the previously received subset 520 of prior search queries 505 and item identifiers 525 included in the user sequence 515.

As further described above in conjunction with FIGS. 3 and 4, in various embodiments the query relevance model 535 has a bidirectional encoder representations from transformers (BERT) architecture. In such a BERT architecture, an input, such as the user sequence, is analyzed from first to last token and from last to first token, allowing determination of relationships between a token and all other tokens in the user sequence. Reviewing tokens surrounding a token in the input allows the query relevance model to better understand relationships between tokens, which provides more information for predicting a subsequent interaction by the user. To train such a query relevance model, the online system uses masked language modeling, where one or more tokens in an input are replaced by a mask and the query relevance model is applied to the masked input to generate predicted tokens corresponding to the masks. Based on differences between the tokens replaced by the mask and the corresponding predicted tokens, parameters of the query relevance model are modified through backpropagation. Training of the query relevance model 535 is further described above in conjunction with FIG. 4.

Based on the set 550 of relevance scores, the online system selects one or more candidate search queries of the set 530 of candidate search queries as recommended search queries. In some embodiments, the online system ranks the set 530 of candidate search queries based on their corresponding relevance scores and selects one or more candidate search queries having at least a threshold position in the ranking as recommended search queries. For example, the online system ranks candidate search terms of the set 530 so candidate search terms with higher relevance scores have higher positions in the ranking and selects a candidate search query having a highest position in the ranking as a recommended search query, or having at least a threshold position in the ranking as recommended search queries.

In various embodiments, the online system accounts for information in addition to corresponding relevance scores when selecting one or more recommended search queries from the candidate search queries. For example, the online system generates a query score for each candidate search query, with the query score for a candidate search query based on a relevance score for the search query and an expected revenue for the candidate search term based on one or more items satisfying the candidate search query (or an expected amount of interaction with items satisfying the candidate search query). As an example, the query score for a candidate search query is a product of a relevance score for the candidate search query and an expected revenue for the candidate search query (or an expected amount of interaction based on the candidate search query). In other embodiments, the online concierge system 140 differently combines the relevance score for a candidate search term and an expected revenue for the candidate search term (or another metric for the candidate search term) to generate a query score. The online system ranks the candidate search queries based on their query scores and selects one or more candidate search queries based on the ranking as recommended search queries, or selects candidate search queries having at least a threshold query score as recommended search queries.

After selecting one or more recommended search queries from the set 550 of candidate search queries, the online system generates instructions for generating a search interface 555 and transmits the instructions to a user client device of the user 500. The instructions include the one or more recommended search queries. When executed by the user client device, the instructions cause the user client device to display the search interface 555 with the one or more recommended search terms displayed to the user 500 before the user client device 100 receives an interaction with the search interface 555 from the user 500. In the example of FIG. 5, the online system selects recommended search query 560 from the set 530 of candidate search queries based on its relevance score and transmits instructions to a user client device that displays recommended search query 560 in a search element, such as a search box, of the search interface 555 before the user 500 interacts with the search interface 555. In embodiments where the online concierge system 140 selects multiple recommended search terms, the search interface 555 displays the recommended search terms proximate to a search element, such as a search box, prior to receiving input from the user 500 with the search interface 555.

Initially displaying the one or more recommended search terms allows the user 500 to perform a search using one of the recommended search queries rather than manually entering search terms to the search interface 555 to create a search query. Thus, initially displaying the recommended search queries reduces an amount of interaction by the user 500 to search for items, allowing the user 500 to identify items more quickly for interaction (e.g., inclusion in an order, inclusion in a collection, viewing), allowing the user 500 to identify items more quickly for interaction with less input to the search interface 555. As the recommended search queries were selected based on prior search queries 505 and item identifiers 525 associated with prior interactions 510 by the user 500 with the online system, the recommended search queries account for a broader range of customer interactions with the online system than only the customer's prior search queries 505, increasing a likelihood of the recommended search queries being relevant to the user 500.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:
receiving, at the computer system, a request from a user for a search interface;
retrieving prior search queries previously received from the user and one or more specific interactions previously performed by the user with the computer system;
generating a user sequence for the user, the user sequence including one or more prior search queries previously received from the user and one or more item identifiers of items associated with at least a subset of the one or more specific interactions previously performed by the user;

generating a set of candidate search queries based on the prior search queries the computer system previously received from the user;

generating a relevance score for each candidate search query of the set of candidate search queries by applying a query relevance model to the user sequence and the set of candidate search queries, the query relevance model including a user sequence encoder generating a sequence embedding for the user sequence and a classifier generating the relevance scores based on the sequence embedding and the set of candidate search queries, the query relevance model trained by:

applying the query relevance model to one or more masked training customer sequences, a masked user sequence including one or more tokens replaced by a mask to generate one or more predicted tokens corresponding to positions in a training user sequence including the mask;

generating a loss based on a difference between a predicted token in a position in the training user sequence including the mask and a token in the position in the training user sequence; and updating one or more parameters of the user sequence encoder through backpropagation based on the loss until one or more criteria are satisfied;

selecting one or more of the candidate search queries as recommended search queries based on the relevance scores; and transmitting instructions for generating the search interface to a user client device of the user, the instructions, when executed by the user device display one or more of the recommended search queries in the search interface before receiving an interaction from the user with the search interface.

2. The method of claim 1, wherein the classifier of the query relevance model is trained by:

freezing parameters of the user sequence encoder;

retrieving a dataset of query training user sequences, each query training user sequence including item identifiers and search queries with a search query in a final position of each query training user sequence;

generating masked query training user sequences by replacing the search query the final position of each query training user sequence with the mask;

for each query training user sequence:
applying the query relevance model to a masked query training customer sequence to generate a predicted token for the final position in the masked query training user sequence;

generating a loss based on a difference between the predicted token for the final position in the masked query training user sequence and the search query in the final position of the query training sequence; and updating one or more parameters of the classifier, without modifying parameters of the user sequence encoder, through backpropagation based on the loss until one or more criteria are satisfied.

3. The method of claim 1, wherein generating the user sequence for the customer comprises:

identifying prior search queries received within a threshold amount of time before receiving the request for the search interface;

identifying item identifiers associated with prior interactions having a specific type and that occurred in a specific time interval; and generating the user sequence to include the identified prior search queries and the identified item identifiers.

4. The method of claim 3, wherein identifying item identifiers associated with prior interactions having a specific type and that occurred in a specific time interval comprises creating an order for fulfillment by the computer system.

5. The method of claim 1, wherein selecting one or more of the candidate search queries comprises selecting, as the one or more candidate search queries, prior search queries the computer system received within a candidate threshold time interval before receiving the request for the search interface.

6. The method of claim 5, wherein selecting one or more of the candidate search queries comprises further selecting, as the one or more candidate search queries, one or more prior search queries the computer system received from the user before the user performed one or more specific types of interactions with the computer system.

7. The method of claim 6, wherein a specific type of interactions with the computer system comprises including an item in an order.

8. The method of claim 1, wherein selecting one or more of the candidate search queries as recommended search queries based on the relevance scores comprises:

generating a query score for each of the candidate search queries, the query score for a candidate search query comprising a combination of the query score for the candidate search query and an additional quantity determined for the candidate search query; and selecting one or more of the candidate search queries as recommended search queries based on the query scores.

9. The method of claim 8, wherein the additional quantity determined for the candidate search query comprises an expected amount of revenue to the computer system from one or more items satisfying the candidate search query.

10. A computer program product comprising a non-transitory computer readable storage medium having instructions encoded thereon that, when executed by a processor, cause the processor to perform steps comprising:

receiving, at an online system, a request from a user for a search interface;

retrieving prior search queries previously received from the user and one or more specific interactions previously performed by the user with the online system;

generating a user sequence for the user, the user sequence including one or more prior search queries previously received from the user and one or more item identifiers of items associated with at least a subset of the one or more specific interactions previously performed by the user;

generating a set of candidate search queries based on the prior search queries the online system previously received from the user;

generating a relevance score for each candidate search query of the set of candidate search queries by applying a query relevance model to the user sequence and the set of candidate search queries, the query relevance model including a user sequence encoder generating a sequence embedding for the user sequence and a classifier generating the relevance scores based on the sequence embedding and the set of candidate search queries, the query relevance model trained by:

applying the query relevance model to one or more masked training customer sequences, a masked user sequence including one or more tokens replaced by a mask to generate one or more predicted tokens corresponding to positions in a training user sequence including the mask;

generating a loss based on a difference between a predicted token in a position in the training user sequence including the mask and a token in the position in the training user sequence; and updating one or more parameters of the user sequence encoder through backpropagation based on the loss until one or more criteria are satisfied;

selecting one or more of the candidate search queries as recommended search queries based on the relevance scores; and transmitting instructions for generating the search interface to a user client device of the user, the instructions, when executed by the user device display one or more of the recommended search queries in the search interface before receiving an interaction from the user with the search interface.

11. The computer program product of claim 10, wherein the classifier of the query relevance model is trained by:

freezing parameters of the user sequence encoder;

retrieving a dataset of query training user sequences, each query training user sequence including item identifiers and search queries with a search query in a final position of each query training user sequence;

generating masked query training user sequences by replacing the search query the final position of each query training user sequence with the mask;

for each query training user sequence:
applying the query relevance model to a masked query training customer sequence to generate a predicted token for the final position in the masked query training user sequence;
generating a loss based on a difference between the predicted token for the final position in the masked query training user sequence and the search query in the final position of the query training sequence; and
updating one or more parameters of the classifier, without modifying parameters of the user sequence encoder, through backpropagation based on the loss until one or more criteria are satisfied.

12. The computer program product of claim 10, wherein generating the user sequence for the user comprises:

identifying prior search queries received within a threshold amount of time before receiving thee request for the search interface;

identifying item identifiers associated with prior interactions having a specific type and that occurred in a specific time interval; and generating the user sequence to include the identified prior search queries and the identified item identifiers.

13. The computer program product of claim 12, wherein identifying item identifiers associated with prior interactions having a specific type and that occurred in a specific time interval comprises creating an order for fulfillment by the computer system.

14. The computer program product of claim 10, wherein selecting one or more of the candidate search queries comprises selecting, as the one or more candidate search queries, prior search queries the computer system received within a candidate threshold time interval before receiving the request for the search interface.

15. The computer program product of claim 14, wherein selecting one or more of the candidate search queries comprises further selecting, as the one or more candidate search queries, one or more prior search queries the computer system received from the user before the user performed one or more specific types of interactions with the computer system.

16. The computer program product of claim 15, wherein a specific type of interactions with the online system comprises including an item in an order.

17. The computer program product of claim 10, wherein selecting one or more of the candidate search queries as recommended search queries based on the relevance scores comprises:

generating a query score for each of the candidate search queries, the query score for a candidate search query comprising a combination of the query score for the candidate search query and an additional quantity determined for the candidate search query; and selecting one or more of the candidate search queries as recommended search queries based on the query scores.

18. The computer program product of claim 17, wherein the additional quantity determined for the candidate search query comprises an expected amount of revenue to the online system from one or more items satisfying the candidate search query.

19. A system comprising:

a processor;

a non-transitory computer readable storage medium having instructions encoded thereon that, when executed by the processor, cause the processor to perform steps comprising:

receiving, at an online system, a request from a user for a search interface;

retrieving prior search queries previously received from the user and one or more specific interactions previously performed by the user with the online system;

generating a user sequence for the user, the user sequence including one or more prior search queries previously received from the user and one or more item identifiers of items associated with at least a subset of the one or more specific interactions previously performed by the user;

generating a set of candidate search queries based on the prior search queries the online system previously received from the user;

generating a relevance score for each candidate search query of the set of candidate search queries by applying a query relevance model to the user sequence and the set of candidate search queries, the query relevance model including a user sequence encoder generating a sequence embedding for the user sequence and a classifier generating the relevance scores based on the sequence embedding and the set of candidate search queries, the query relevance model trained by:

applying the query relevance model to one or more masked training customer sequences, a masked user sequence including one or more tokens replaced by a mask to generate one or more predicted tokens corresponding to positions in a training user sequence including the mask;

generating a loss based on a difference between a predicted token in a position in the training user sequence including the mask and a token in the position in the training user sequence; and updating one or more parameters of the user sequence encoder through backpropagation based on the loss until one or more criteria are satisfied;

selecting one or more of the candidate search queries as recommended search queries based on the relevance scores; and transmitting instructions for generating the search interface to a user client device of the user, the instructions, when executed by the user device display one or more of the recommended search queries in the search interface before receiving an interaction from the user with the search interface.

20. The system of claim 19, wherein the classifier of the query relevance model is trained by:

freezing parameters of the user sequence encoder;

retrieving a dataset of query training user sequences, each query training user sequence including item identifiers and search queries with a search query in a final position of each query training user sequence;

generating masked query training user sequences by replacing the search query the final position of each query training user sequence with the mask;

for each query training user sequence:
applying the query relevance model to a masked query training customer sequence to generate a predicted token for the final position in the masked query training user sequence;

generating a loss based on a difference between the predicted token for the final position in the masked query training user sequence and the search query in the final position of the query training sequence; and updating one or more parameters of the classifier, without modifying parameters of the user sequence encoder, through backpropagation based on the loss until one or more criteria are satisfied.

* * * * *